(12) United States Patent
Seki et al.

(10) Patent No.: US 11,121,602 B2
(45) Date of Patent: Sep. 14, 2021

(54) STATOR OF ROTARY ELECTRIC MACHINE

(71) Applicant: HONDA MOTOR CO., LTD., Tokyo (JP)

(72) Inventors: Yoshiaki Seki, Saitama (JP); Misa Aneha, Saitama (JP); Hideyuki Yoshida, Saitama (JP); Takehiro Imamura, Saitama (JP)

(73) Assignee: HONDA MOTOR CO., LTD., Tokyo (JP)

( * ) Notice: Subject to any disclaimer, the term of this patent is extended or adjusted under 35 U.S.C. 154(b) by 53 days.

(21) Appl. No.: 16/519,688

(22) Filed: Jul. 23, 2019

(65) Prior Publication Data

US 2020/0036260 A1 Jan. 30, 2020

(30) Foreign Application Priority Data

Jul. 24, 2018 (JP) .............................. JP2018-138833

(51) Int. Cl.
| | | |
|---|---|---|
| *H02K 5/22* | (2006.01) | |
| *H02K 3/52* | (2006.01) | |
| *H02K 15/095* | (2006.01) | |
| *H02K 3/50* | (2006.01) | |

(52) U.S. Cl.
CPC .............. *H02K 5/225* (2013.01); *H02K 3/50* (2013.01); *H02K 3/522* (2013.01); *H02K 15/095* (2013.01); *H02K 2203/09* (2013.01)

(58) Field of Classification Search
CPC .... H02K 15/095; H02K 2203/09; H02K 3/50; H02K 3/522; H02K 5/225
USPC .......................................................... 310/71
See application file for complete search history.

(56) References Cited

U.S. PATENT DOCUMENTS

| | | | | |
|---|---|---|---|---|
| 7,952,245 | B2 * | 5/2011 | Ueda ...................... | H02K 3/522 310/71 |
| 2009/0026859 | A1 * | 1/2009 | Kinoshita .............. | H02K 29/08 310/71 |
| 2010/0148615 | A1 * | 6/2010 | Sasaki .................... | H02K 3/522 310/180 |

(Continued)

FOREIGN PATENT DOCUMENTS

| | | |
|---|---|---|
| CN | 102820724 A | 12/2012 |
| CN | 105075072 A | 11/2015 |

(Continued)

OTHER PUBLICATIONS

Dec. 23, 2020, Chinese Office Action issued for related CN Application No. 201910623227.4.

*Primary Examiner* — Alex W Mok
(74) *Attorney, Agent, or Firm* — Paratus Law Group, PLLC

(57) ABSTRACT

A stator of a rotary electric machine comprises a stator core, a coil; and a plurality of bus bars. When viewed from a rotational axis direction of the rotary electric machine, the first terminal parts of the plurality of bus bars are arranged next to one another substantially in an upper and lower direction on the outside of the stator core in the radial direction, and the second terminal parts of the plurality of bus bars are arranged next to one another substantially in a horizontal direction above the stator core, and a first terminal part arranged on an uppermost side among the first terminal parts of the plurality of bus bars is arranged to be positioned below an uppermost part of the stator core.

9 Claims, 6 Drawing Sheets

(56) References Cited

U.S. PATENT DOCUMENTS

| | | | | |
|---|---|---|---|---|
| 2010/0320852 A1* | 12/2010 | Isogai | ................... | H02K 5/225 |
| | | | | 310/71 |
| 2011/0234031 A1* | 9/2011 | Kato | ..................... | H02K 3/522 |
| | | | | 310/71 |
| 2012/0313460 A1 | 12/2012 | Schäflein et al. | | |
| 2014/0265694 A1* | 9/2014 | Matsuoka | .............. | H02K 16/00 |
| | | | | 310/112 |
| 2015/0042190 A1* | 2/2015 | Nagumo | ................ | H02K 5/225 |
| | | | | 310/71 |
| 2015/0061426 A1* | 3/2015 | Nagumo | ................ | H02K 5/225 |
| | | | | 310/58 |
| 2015/0137637 A1* | 5/2015 | Jang | .................... | H02K 15/095 |
| | | | | 310/71 |
| 2015/0188376 A1* | 7/2015 | Yamaguchi | ............ | H02K 3/522 |
| | | | | 310/71 |
| 2016/0020658 A1* | 1/2016 | Tamura | ................... | H02K 3/50 |
| | | | | 310/54 |
| 2016/0020660 A1 | 1/2016 | Houzumi et al. | | |
| 2016/0301272 A1* | 10/2016 | Haruno | ................... | H02K 3/28 |
| 2017/0093239 A1* | 3/2017 | Teranishi | ................ | H02K 3/18 |
| 2017/0110810 A1* | 4/2017 | Kurono | ................... | H02K 3/50 |
| 2017/0110929 A1* | 4/2017 | Egami | ................... | H02K 5/225 |
| 2018/0040392 A1* | 2/2018 | Fujiwara | .................. | H02K 3/12 |

FOREIGN PATENT DOCUMENTS

| | | | | |
|---|---|---|---|---|
| JP | H09-271161 A | | 10/1997 | |
| JP | 2010263768 A | * | 11/2010 | |
| JP | 2013008656 A | * | 1/2013 | ............ H01R 25/14 |
| JP | 2015056937 A | * | 3/2015 | |
| JP | 2016-096663 A | | 5/2016 | |
| JP | 2017192194 A | * | 10/2017 | ............... H02K 3/44 |

\* cited by examiner

STATOR OF ROTARY ELECTRIC MACHINE

CROSS-REFERENCE TO RELATED APPLICATIONS

This application is based on and claims priority under 35 USC 119 from Japanese Patent Application No. 2018-138833 filed on Jul. 24, 2018.

TECHNICAL FIELD

The present invention relates to a stator of a rotary electric machine mounted in an electric vehicle or the like.

BACKGROUND ART

In the related art, in an electric vehicle or the like, a rotary electric machine is mounted as a driving source. For example, JP-A-2016-096663 discloses a stator of a rotary electric machine mounted in an electric vehicle, a hybrid vehicle, or the like. The stator of the rotary electric machine of JP-A-2016-096663 includes a stator core, a coil attached to the stator core, and a plurality of bus bars corresponding to respective phases of the coil. The plurality of bus bars have one end-side terminal parts of the bus bars which are electrically connected to the terminal parts of respective phases of the coil and the other end-side terminal parts of the bus bars which are connected electrically to the terminal parts of the power conversion device.

SUMMARY

However, in the stator of the rotary electric machine of JP-A-2016-096663, one end-side terminal parts of the bus bars which are connected electrically to the terminal parts of respective phases of the coil and the other end-side terminal parts of the bus bars which are connected electrically to the terminal parts of the power conversion device are all positioned on the upper side of the stator. In this case, the terminal parts of respective phases of the coil are arranged to protrude above the stator, and similarly, the one end-side terminal parts of the bus bars are arranged to protrude above the stator. Thus, the bus bars are arranged with a predetermined interval above the uppermost portion of the stator core. Therefore, there is a problem that in the entire rotary electric machine, the height of the upper portion of the stator is increased, and an occupant space or a luggage compartment space is narrowed when the stator is mounted in the vehicle.

The invention provides a stator of a rotary electric machine capable of reducing the height of an upper side of the stator of the rotary electric machine even when a power conversion device is arranged above the rotary electric machine.

An embodiment of the present invention relates to a stator of a rotary electric machine comprising:
a stator core;
a coil attached to the stator core; and
a plurality of bus bars which have first terminal parts which are provided in one end portions thereof and electrically connected to terminal parts of respective phases of the coil, and second terminal parts which are provided in the other end portions thereof and electrically connected to terminal parts of a power conversion device corresponding to respective phases of the coil, wherein
when viewed from a rotational axis direction of the rotary electric machine,
the first terminal parts of the plurality of bus bars are arranged next to one another substantially in an upper and lower direction on the outside of the stator core in the radial direction,
the second terminal parts of the plurality of bus bars are arranged next to one another substantially in a horizontal direction above the stator core, and
a first terminal part arranged on an uppermost side among the first terminal parts of the plurality of bus bars is arranged to be positioned below an uppermost part of the stator core.

According to one aspect of the invention, the height of the upper side of the stator of the rotary electric machine can be reduced even when the power conversion device is arranged above the rotary electric machine.

DESCRIPTION OF EMBODIMENTS

Hereinafter, an embodiment of a stator of a rotary electric machine of the invention will be described based on the accompanying drawings.

Figure 1:
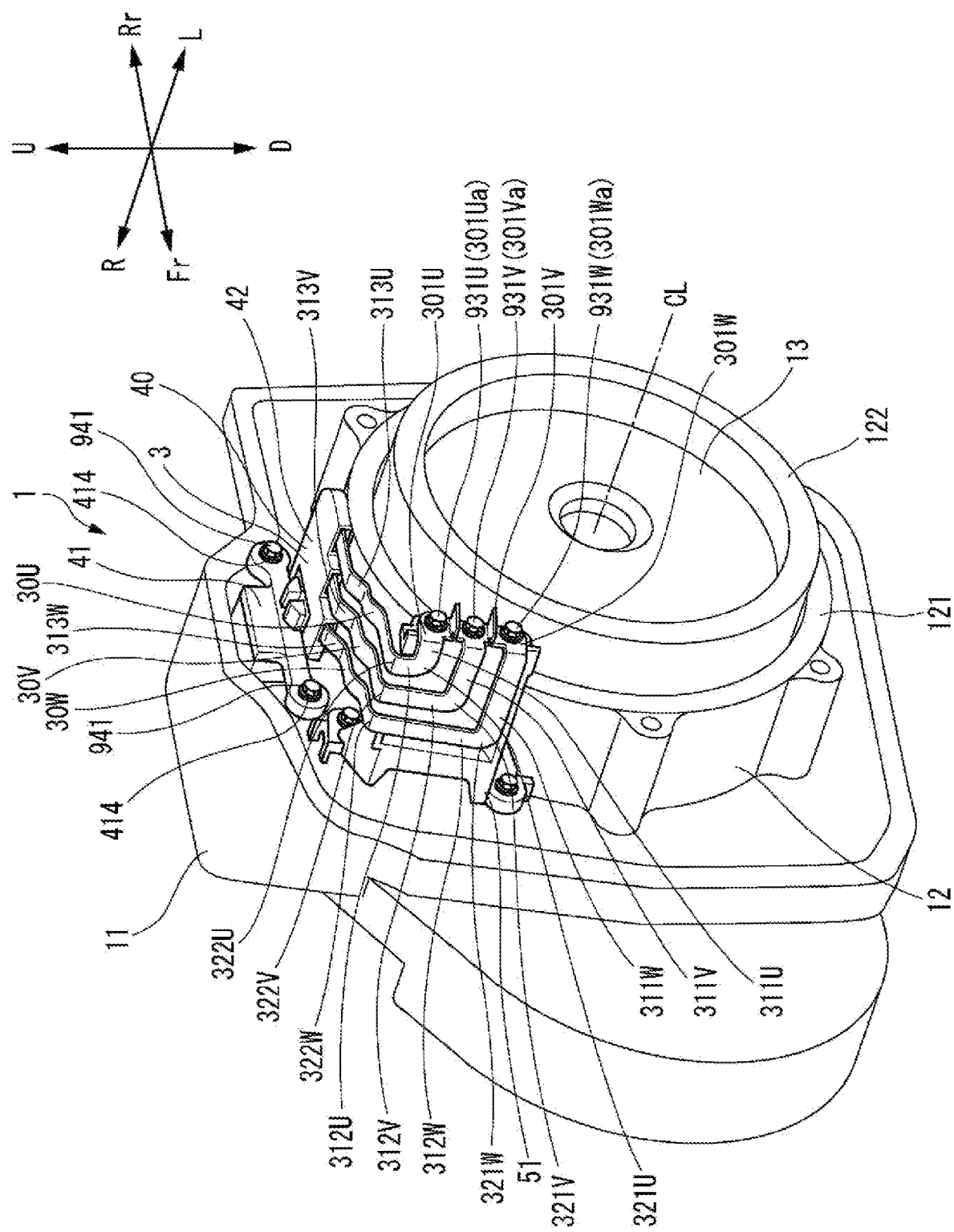
FIG. 1 is a perspective view illustrating an entire configuration of a rotary electric machine in which a stator of a rotary electric machine of an embodiment of the invention is mounted.

First, the entire configuration of the rotary electric machine in which the stator of an embodiment of the invention is mounted is described based on FIG. 1. For example, a rotary electric machine 1 illustrated in FIG. 1 is a traveling motor to be mounted in a vehicle such as a hybrid vehicle and an electric vehicle. However, the configuration of the invention is not limited to the traveling motor and can be applied to a power generation motor, a motor for other purposes, or rotary electric machines (including a generator) other than a rotary electric machine for a vehicle.

In this specification, for the simplification of the description, the front, rear, right, left, upper, and lower directions of the rotary electric machine 1 are defined as illustrated in the drawings such that the front direction is set to Fr, the rear direction is set to Rr, the right direction is set to R, the left direction is set to L, the upper direction is set to U, and the lower direction is set to D. However, the directions illustrated in the drawings are irrelevant to the directions of the vehicle or the like in which the rotary electric machine 1 is mounted.

As illustrated in FIG. 1, the rotary electric machine 1 includes a stator 12, a rotor 13, and a case 11 for accommodating the stator 12 and the rotor 13. The rotor 13 has an annular shape and is externally fitted to a shaft (not illustrated). The stator 12 includes a stator core 121, a coil 122 to be mounted in the stator core 121, and a bus bar unit 3. Inside the case 11, in addition to the stator 12 and the rotor 13, a first terminal block 51 which supplies electric power to the coil 122 is provided on the upper left side, and a second terminal block 52 in which a bus bar on a power conversion device 2 side is connected is provided on the upper side. The bus bar unit 3 is electrically connected to the first terminal block 51 and the second terminal block 52 inside the case 11.

The stator core 121 is formed in a cylindrical shape to surround the rotor 13 from the outside in a radial direction and is fixed to the case 11 by fastening members such as bolts.

The coil 122 is a three-phase coil which is configured by a U phase, a V phase, and a W phase. The coil 122 may be a segment coil or may be a continuous winding.

The bus bar unit 3 includes three bus bars 30U, 30V, and 30W and a cover member 40 which collectively covers the three bus bars 30U, 30V, and 30W.

As illustrated in FIGS. 1 to 4, the three bus bars 30U, 30V, and 30W extend in a belt shape from the first terminal block 51 which is electrically connected to the coil 122 to the second terminal block 52 which is electrically connected to the power conversion device 2.

The three bus bars 30U, 30V, and 30W include first terminal parts 301U, 301V, and 301W; first extension parts 311U, 311V, and 311W which extend forward from the first terminal parts 301U, 301V, and 301W; first bent parts 321U, 321V, and 321W which are bent upward from the front end portions of the first extension parts 311U, 311V, and 311W; second extension parts 312U, 312V, and 312W which extend upward from the first bent parts 321U, 321V, and 321W; second bent parts 322U, 322V, and 322W which are bent rightward from the upper end portions of the second extension parts 312U, 312V, and 312W; third extension parts 313U, 313V, and 313W which extend in a right direction from the second bent parts 322U, 322V, and 322W; third bent parts 323U, 323V, and 323W which are bent forward from the right end portions of the third extension parts 313U, 313V, and 313W; fourth extension parts 314U, 314V, and 314W which extend forward from the third bent parts 323U, 323V, and 323W; fourth bent parts 324U, 324V, and 324W which are bent upward from the front end portions of the fourth extension parts 314U, 314V, and 314W; fifth extension parts 315U. 315V, and 315W which extend upward from the fourth bent parts 324U, 324V, and 324W; and second terminal parts 302U, 302V, and 302W which are connected to the fifth extension parts 315U, 315V, and 315W, respectively.

In the three bus bars 30U, 30V, and 30W, the extension parts 311U to 315U, 311V to 315V, and 311W to 315W are arranged in parallel while maintaining a predetermined interval.

Herein, the extension parts 311U to 315U, 311V to 315V, and 311W to 315W do not necessarily extend in a straight line and may have an inclined portion in the middle thereof. The third extension parts 313U. 313V, and 313W of the embodiment have forward inclined parts 313Ua, 313Va, and 313Wa which are inclined forward from the left side to the right side, and upward inclined parts 313Ub, 313Vb, and 313Wb which are inclined upward from the left side to the right side.

The first terminal parts 301U, 301V, and 301W are arranged next to one another substantially in the upper and lower direction in the first terminal block 51 which is arranged on the outside of the stator core 121 in the radial direction. The second terminal parts 302U, 302V, and 302W are arranged next to one another substantially in a horizontal direction in the second terminal block 52 which is arranged above the stator core 121.

The arrangement of the three bus bars 30U, 30V, and 30W can be set as appropriate. However, in the embodiment, the first terminal parts 301U, 301V, and 301W are arranged in this order from the upper side to the lower side, and the second terminal parts 302U. 302V, and 302W are arranged in this order from the right side to the left side in the second terminal block 52.

The first terminal parts 301U, 301V, and 301W include hole parts 301Ua, 301Va, and 301Wa into which bolts 931U, 931V, and 931W are inserted on the plane substantially perpendicular to the front and rear direction. The first terminal parts are fastened to the first terminal block 51 by inserting the bolts 931U, 931V, and 931W into the hole parts 301Ua, 301Va, and 301Wa from the rear side. Further, the first terminal parts 301U, 301V, and 301W are electrically connected, through the first terminal block 51, to the terminal parts (not illustrated) provided in coil end parts 123U, 123V, and 123W (see FIG. 5) of respective phases of the U phase, the V phase, and the W phase which extend from the coil 122.

The second terminal parts 302U, 302V, and 302W are fastened to the second terminal block 52 on the plane substantially perpendicular to the upper and lower direction by inserting the bolts 932U, 932V, and 932W from above. Further, the second terminal parts 302U, 302V, and 302W are electrically connected to the terminal parts (not illustrated) of the power conversion device 2 having respective phases of the U phase, the V phase, and the W phase through the second terminal block 52.

As described above, the three bus bars 30U, 30V, and 30W have the first extension parts 311U, 311V, and 311W and the fourth extension parts 314U, 314V, and 314W which extend in the front and rear direction, that is, a rotational axis CL direction of the rotary electric machine 1; the second extension parts 312U, 312V, and 312W and the fifth extension parts 315U, 315V, and 315W which extend in the upper and lower direction when viewed from the rotational axis CL direction of the rotary electric machine 1; and the third extension parts 313U, 313V, and 313W which extend in the horizontal direction when viewed from the rotational axis CL direction of the rotary electric machine 1.

Therefore, when the first terminal parts 301U, 301V, and 301W and the second terminal parts 302U, 302V, and 302W are fastened to the first terminal block 51 and the second terminal block 52, although a manufacturing error occurs in the bus bars 30U, 30V, and 30W, stress can be dispersed in each direction of mutually perpendicular three directions of the rotational axis CL direction of the rotary electric machine 1, the upper and lower direction when viewed from the rotational axis CL direction, and the horizontal direction when viewed from the rotational axis CL direction. Accordingly, the cross-sectional areas of the bus bars 30U, 30V, and 30W can be reduced and thus, the cost of the bus bars 30U, 30V, and 30W can be reduced. Further, the bus bars 30U, 30V, and 30W can be arranged along the side surface of the stator 12, and thus space efficiency is excellent.

Figure 5:
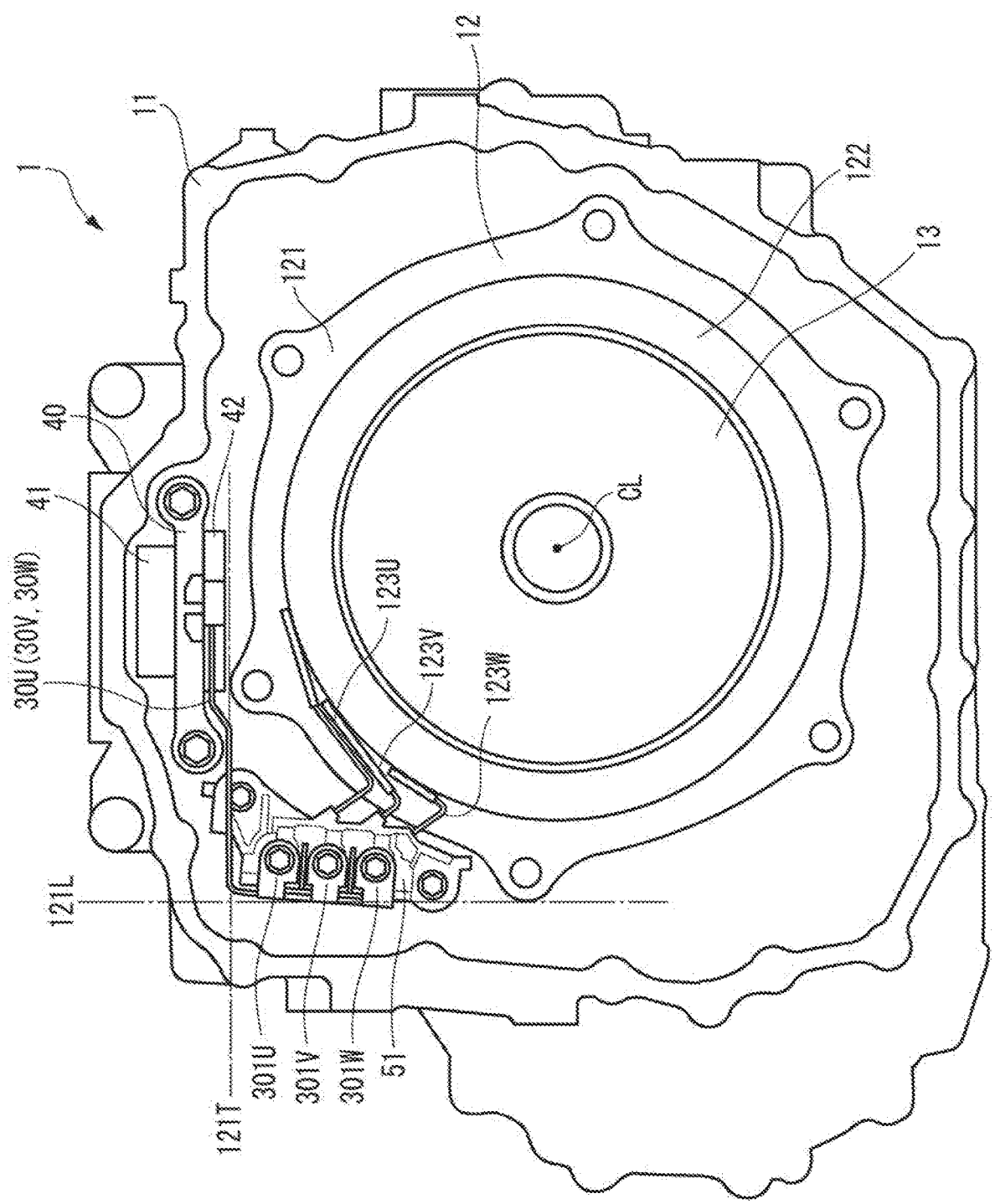
FIG. 5 is a view illustrating the stator of the rotary electric machine of FIG. 1 when viewed from a rotational axis direction.

As illustrated in FIG. 5, the third extension parts 313U, 313V, and 313W extend above the stator core 121 in the horizontal direction when viewed from the rotational axis CL direction of the rotary electric machine 1. Further, the first terminal part 301U which is arranged on the uppermost side among the first terminal parts 301U, 301V, and 301W is arranged to be positioned below an uppermost part 121T of the stator core 121.

Accordingly, in the three bus bars 30U. 30V, and 30W, the third extension parts 313U, 313V, and 313W which extend in the horizontal direction when viewed from the rotational axis CL direction of the rotary electric machine 1 can be arranged without a predetermined interval above the stator core 121. Thus, even when the power conversion device 2 is arranged above the rotary electric machine 1, the height of the upper side of the stator 12 in the rotary electric machine 1 can be reduced.

The third extension parts 313U, 313V, and 313W of the three bus bars 30U, 30V, and 30W are arranged to extend at the same height in the horizontal direction when viewed from the rotational axis CL direction of the rotary electric machine 1.

Accordingly, any one of the third extension parts 313U, 313V, and 313W of the three bus bars 30U, 30V, and 30W is arranged without a predetermined interval above the stator core 121. Thus, the height of the upper side of the stator 12 in the rotary electric machine 1 can be reduced.

On the other hand, the first terminal part 301W arranged on the lowermost side among the first terminal parts 301U, 301V, and 301W is arranged to be positioned above the rotational axis CL of the rotary electric machine 1.

Accordingly, it is possible to control the increase of the lengths of the three bus bars 30U. 30V, and 30W while reducing the height of the upper side of the stator 12 in the rotary electric machine 1.

The first terminal parts 301U, 301V, and 301W of the three bus bars 30U, 30V, and 30W are positioned on a more central side than a left utmost end part 121L of the stator core 121 in the horizontal direction when viewed from the rotational axis CL direction of the rotary electric machine 1. In the embodiment, the first terminal parts 301U, 301V, and 301W are arranged such that respective left end surfaces of the first terminal parts 301U, 301V, and 301W and the left utmost end part 121L of the stator core 121 have almost the same position in the horizontal direction when viewed from the rotational axis CL direction of the rotary electric machine 1.

Therefore, the first terminal parts 301U. 301V, and 301W are arranged so as not to protrude from the stator core 121 in the horizontal direction when viewed from the rotational axis CL direction of the rotary electric machine 1. Accordingly, the first extension parts 311U. 311V, and 311W which extend forward from the first terminal parts 301U. 301V, and 301W can be arranged on a more central side than the left utmost end part of the stator core 121, in the horizontal direction when viewed from the rotational axis CL direction of the rotary electric machine 1. Accordingly, all of the bus bars 30U, 30V, and 30W can be arranged on a more central side than the left utmost end part of the stator core 121. Thus, it is possible to reduce the length of the stator 12 of the rotary electric machine 1 in the horizontal direction.

In the embodiment, all parts of the first terminal parts 301U, 301V, and 301W are positioned on a more central side than the left utmost end part of the stator core 121. However, it is sufficient that at least a part thereof is positioned on a more central side than the left utmost end part of the stator core 121 in the horizontal direction when viewed from the rotational axis CL direction of the rotary electric machine 1. Accordingly, even when the first terminal parts 301U, 301V, and 301W are arranged outside the left utmost end part of the stator core 121, the bus bars 30U, 30V, and 30W can be arranged on a more central side in the horizontal direction. Thus, it is possible to reduce the length of the stator 12 of the rotary electric machine 1 in the horizontal direction.

Figure 2:
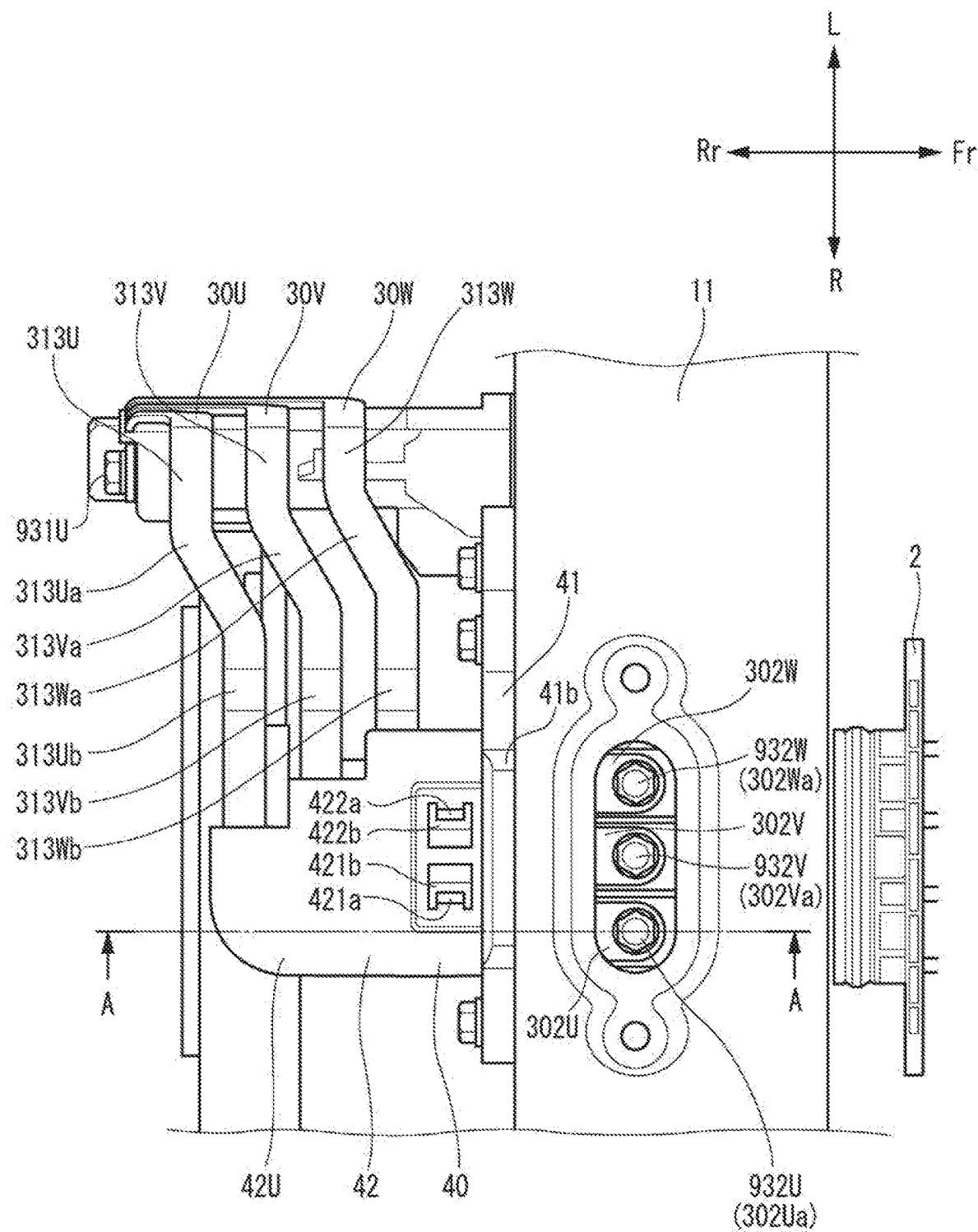
FIG. 2 is a view illustrating the stator of the rotary electric machine of FIG. 1 when viewed from above.
Figure 3:
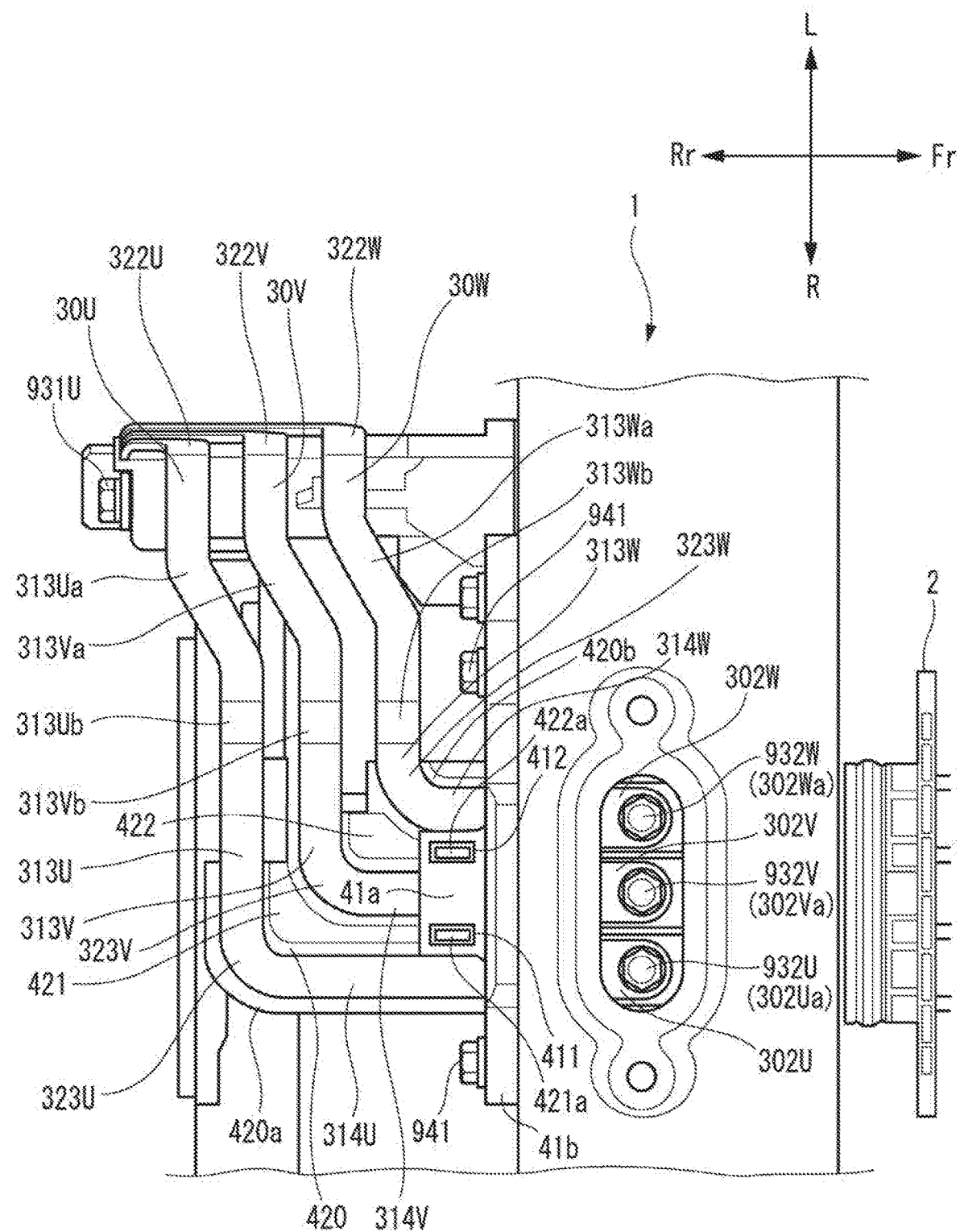
FIG. 3 is a view illustrating the stator of the rotary electric machine of FIG. 2 when viewed from above in a state where an upper cover of a cover member is removed.
Figure 4:
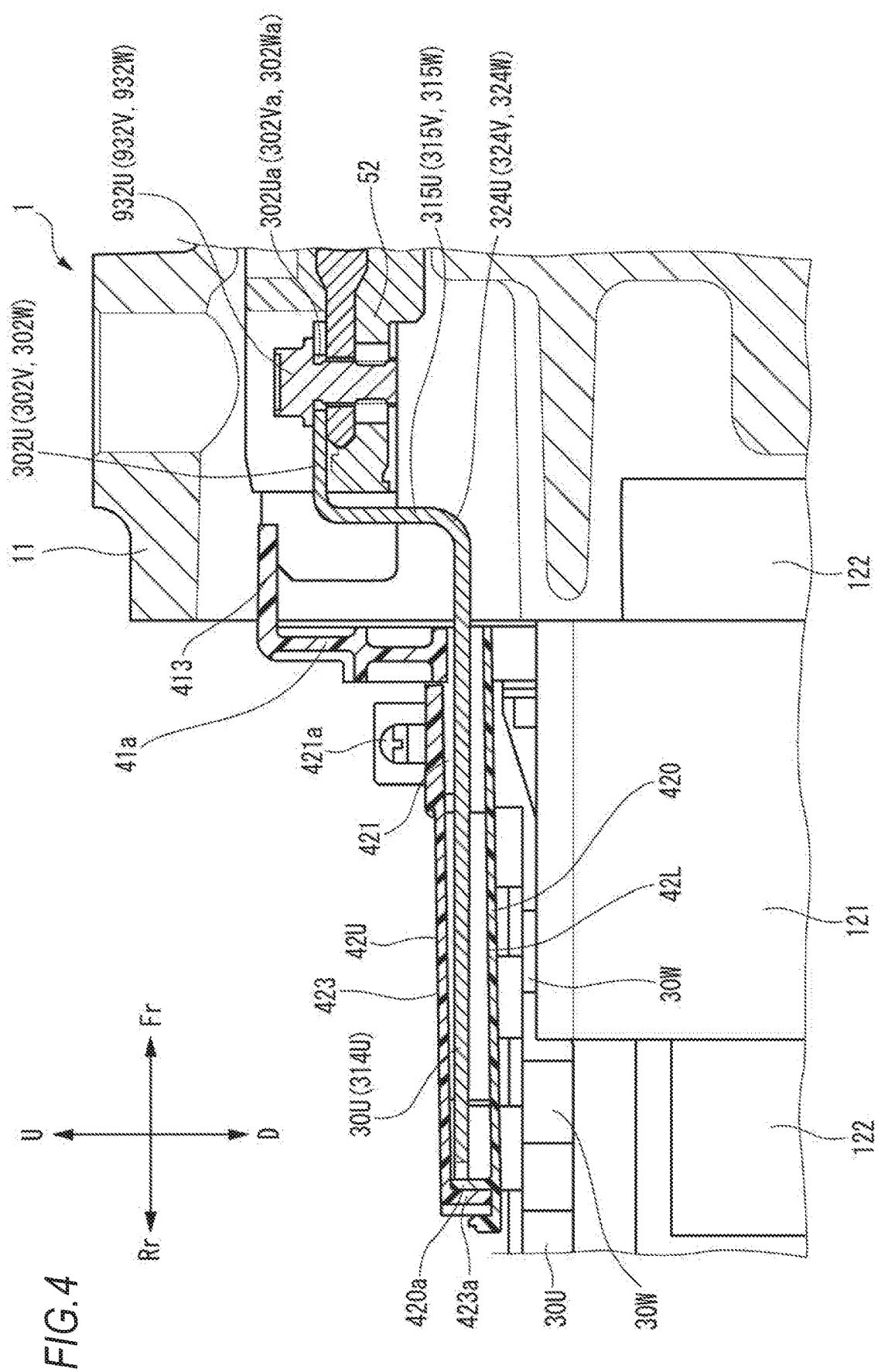
FIG. 4 is a cross-sectional view of a bus bar unit of FIG. 2 taken along line A-A.

As illustrated in FIGS. 2 to 4, the cover member 40 partially covers the right-end side of the upward inclined parts 313Ub, 313Vb, and 313Wb of the third extension parts 313U, 313V, and 313W and covers the third bent parts 323U, 323V, and 323W and the fourth extension parts 314U, 314V, and 314W. The three bus bars 30U, 30V, and 30W are arranged next to one another on the same plane inside the cover member 40.

As described above, in the bus bars 30U, 30V, and 30W, the third bent parts 323U, 323V, and 323W are covered with the cover member 40. Thus, even when the bus bars 30U, 30V, and 30W move relatively in the front and rear direction, the right and left direction, and the upper and lower direction, the third bent parts 323U, 323V, and 323W are caught in the cover member 40 and are not fallen from the cover member 40. Therefore, after the assembly of the bus bar unit 3, the three bus bars 30U, 30V, and 30W can be handled as one body by the cover member 40.

The cover member 40 includes a cover base 41 which is attached to the case 11 of the rotary electric machine 1 and a cover part 42 which covers the three bus bars 30U, 30V, and 30W. The cover part 42 includes an upper cover 42U which covers the three bus bars 30U, 30V, and 30W from above and a lower cover 42L which covers the three bus bars 30U, 30V, and 30W from below.

In the width direction of the three bus bars 30U. 30V, and 30W arranged next to one another on the same plane, the lower cover 42L has a bottom surface 420, an end wall part 420a which is erected at the right end portion and the rear end portion of the bottom surface 420, and an end wall part 420b which is erected at the left end portion of the bottom surface 420. Further, a first partition wall 421 arranged between the bus bar 30U and the bus bar 30V and a second partition wall 422 arranged between the bus bar 30V and the bus bar 30W are provided in the lower cover 42L.

A pair of engagement claws 421a and 422a extending upward are provided on the front end side of the fourth extension parts 314U, 314V, and 314W of the first partition wall 421 and the second partition wall 422.

The upper cover 42U includes an upper surface 423 which faces the bottom surface 420 of the lower cover 42L and an outer peripheral wall 423a which extends downward from the upper surface 423 and surrounds the end wall part 420a and the end wall part 420b of the lower cover 42L. Further, a pair of engagement holes 421b and 422b which are engaged with the engagement claws 421a and 422a of the lower cover 42L are provided in the upper cover 42U.

The cover base 41 includes a holding part 41a which holds the upper cover 42U and the lower cover 42L and a cover fixing part 41b which fixes the cover base 41 to the case 11 of the rotary electric machine 1.

A pair of insertion holes 411 and 412 for inserting the engagement claws 421a and 422a are provided in the holding part 41a of the cover base 41. Therefore, the pair of engagement claws 421a and 422a provided in the lower cover 42L are engaged with the pair of engagement holes 421b and 422b provided in the upper cover 42U through the pair of insertion holes 411 and 412, thereby holding the upper cover 42U and the lower cover 42L in the cover base 41.

Accordingly, the cover base 41, the upper cover 42U, and the lower cover 42L are fixed in one place, and thus the structure can be simplified.

The cover fixing part 41b of the cover base 41 includes an insertion part 413 which protrudes toward the case 11 of the rotary electric machine 1 and two fastening holes 414. Therefore, the insertion part 413 is inserted into the case 11 of the rotary electric machine 1, and bolts 941 are inserted into two fastening holes 414, thereby attaching the cover member 40 to the case 11 of the rotary electric machine 1.

Herein, the cover member 40 is configured so as not to be in contact with the three bus bars 30U. 30V, and 30W in the state of being attached to the case 11 of the rotary electric machine 1.

Accordingly, even when the bus bars 30U, 30V, and 30W vibrate, it is possible to prevent abnormal sounds generated due to the contact of the bus bars 30U, 30V, and 30W with the cover member 40.

Further, the bus bar 30U can move in the space configured by the upper cover 42U, the lower cover 42L, the end wall part 420*a*, and the first partition wall 421. Similarly, the bus bar 30V can move in the space configured by the upper cover 42U, the lower cover 42L, the first partition wall 421, and the second partition wall 422, and the bus bar 30W can move in the space configured by the upper cover 42U, the lower cover 42L, the second partition wall 422, and the end wall part 420*b*.

Accordingly, when the first terminal parts 301U, 301V, and 301W are fastened to the first terminal block 51, and when the second terminal parts 302U, 302V, and 302W are fastened to the second terminal block 52, the three bus bars 30U, 30V, and 30W can move to some extent within the cover part 42. Thus, even when the manufacturing error occurs in the bus bars 30U, 30V, and 30W, the first terminal parts 301U, 301V, and 301W and the second terminal parts 302U, 302V, and 302W can be easily fastened to the first terminal block 51 and the second terminal block 52.

The engagement claw 421*a* provided in the first partition wall 421 is arranged between the bus bar 30U and the bus bar 30V, and the engagement claw 422*a* provided in the second partition wall 422 is arranged between the bus bar 30V and the bus bar 30W. Thus, the cover base 41 can hold the upper cover 42U and the lower cover 42L with a good balance, and the non-contact state between the cover member 40 and the three bus bars 30U, 30V, and 30W can be maintained.

Figure 6:
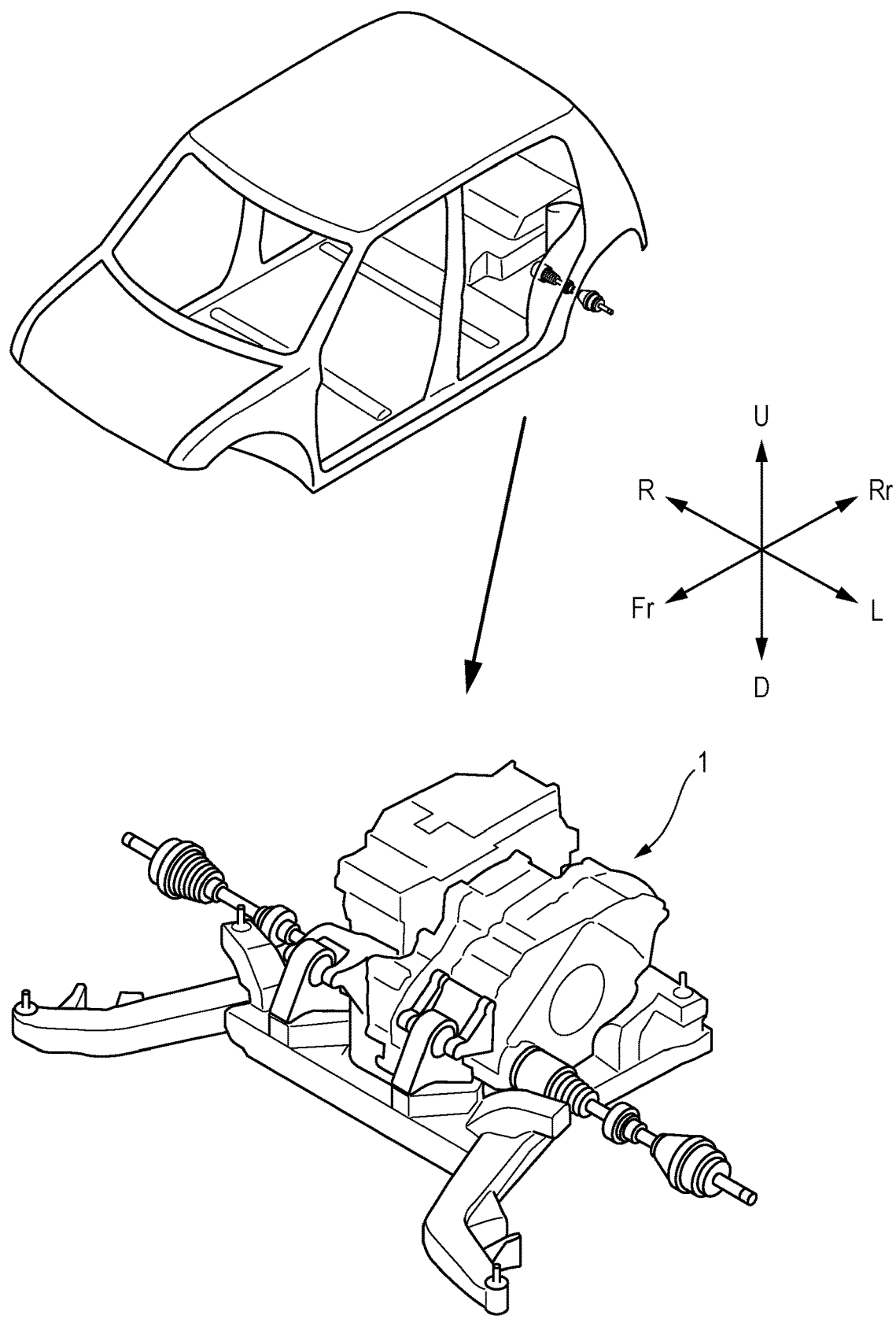
FIG. 6 is a view illustrating the rotary electric machine of FIG. 1 when mounted in a vehicle.

As illustrated in FIG. 6, the rotary electric machine 1 may be mounted in a vehicle. When the rotary electric machine 1 is mounted in a vehicle, the first terminal parts 301U, 301V, and 301W are arranged on a more central side of the vehicle than the rotational axis CL of the rotary electric machine 1 in the front and rear direction. More specifically, when the rotary electric machine 1 is mounted in the vehicle such that the rotational axis CL of the rotary electric machine 1 is directed in the right and left direction of the vehicle and the rotary electric machine 1 is mounted on the front side of the vehicle, the first terminal parts 301U, 301V, and 301W are arranged on the rear side of the vehicle, that is, the front side of the rotary electric machine 1 is positioned on the left side of the vehicle, the rear side of the rotary electric machine 1 is positioned on the right side of the vehicle, the left side of the rotary electric machine 1 is positioned on the rear side of the vehicle, and the right side of the rotary electric machine 1 is positioned on the front side of the vehicle. When the rotary electric machine 1 is mounted on the rear side of the vehicle, the first terminal parts 301U, 301V, and 301W are arranged on the front side of the vehicle, that is, the front side of the rotary electric machine 1 is positioned on the right side of the vehicle, the rear side of the rotary electric machine 1 is positioned on the left side of the vehicle, the left side of the rotary electric machine 1 is positioned on the front side of the vehicle, and the right side of the rotary electric machine 1 is positioned on the rear side of the vehicle.

Accordingly, when the vehicle collides in the front and rear direction, the stator core 121, the coil 122 and the rotor 13 function as protective walls of the first terminal parts 301U, 301V, and 301W in a collision direction. Accordingly, it is possible to protect the first terminal parts 301U, 301V, and 301W.

Herein, the rotary electric machine 1 may be mounted in the vehicle such that the rotational axis CL of the rotary electric machine 1 is directed in the upper and lower direction of the vehicle. Similarly, also in this case, when the rotary electric machine 1 is mounted in the vehicle, the rotary electric machine is arranged such that the first terminal parts 301U, 301V, and 301W are positioned on a more central side of the vehicle than the rotational axis CL of the rotary electric machine 1 in the front and rear direction.

The above-described embodiment may be modified and improved as appropriate.

For example, in the embodiment, the three bus bars 30U, 30V, and 30W are arranged next to one another in this order. However, the three bus bars may be arranged in an arbitrary order.

The three bus bars 30U, 30V, and 30W are not limited to the shape of this embodiment. It is sufficient that the three bus bars have at least three extension parts extending in mutually perpendicular three directions and bent parts for connecting two extension parts.

In the embodiment, the cover member 40 is arranged above the stator 12. However, the cover member may be arranged in such an arbitrary position that enables to collectively cover the three bus bars 30U, 30V, and 30W.

The description in the specification includes at least the following. Although corresponding components or the like in the above-described embodiments are indicated in the parentheses, the invention is not limited thereto.

(1) A stator (stator 12) of a rotary electric machine (rotary electric machine 1) includes:

a stator core (stator core 121);

a coil (coil 122) attached to the stator core; and a plurality of bus bars (bus bars 30U, 30V, and 30W) which have first terminal parts (first terminal parts 301U, 301V, and 301W) which are provided in one end portions thereof and electrically connected to terminal parts of respective phases of the coil, and second terminal parts (second terminal parts 302U, 302V, and 302W) which are provided in the other end portions thereof and electrically connected to terminal parts of a power conversion device corresponding to respective phases of the coil, wherein when viewed from a rotational axis (rotational axis CL) direction of the rotary electric machine, the first terminal parts of the plurality of bus bars are arranged next to one another substantially in an upper and lower direction on the outside of the stator core in the radial direction, the second terminal parts of the plurality of bus bars are arranged next to one another substantially in a horizontal direction above the stator core, and a first terminal part (first terminal part 301U) arranged on an uppermost side among the first terminal parts of the plurality of bus bars is arranged to be positioned below an uppermost part (uppermost part 121T) of the stator core.

According to (1), when viewed from the rotational axis direction of the rotary electric machine, the first terminal parts of the plurality of bus bars are arranged next to one another substantially in the upper and lower direction on the outside of the stator core in the radial direction, the second terminal parts of the plurality of bus bars are arranged next to one another substantially in the horizontal direction above the stator core, and the first terminal part arranged on the uppermost side among the first terminal parts of the plurality of bus bars is arranged to be positioned below the uppermost portion of the stator core. Thus, even when the power conversion device is arranged above the rotary electric machine, it is possible to reduce the height of the upper side of the stator of the rotary electric machine.

(2) In the stator of the rotary electric machine according to (1), a first terminal part arranged on a lowermost side among the first terminal parts of the plurality of bus bars is arranged to be positioned above the rotational axis.

According to (2), the first terminal part arranged on the lowermost side among the first terminal parts of the plurality of bus bars is arranged to be positioned above the rotational axis. Thus, it is possible to control the increase of the length of the bus bar while reducing the height of the upper side of the stator of the rotary electric machine.

(3) In the stator of the rotary electric machine according to (1) or (2), at least a part of the first terminal parts of the plurality of bus bars is positioned on a more central side than an utmost end part (left utmost end part 121L) of the stator core in the horizontal direction.

According to (3), at least a part of the first terminal parts of the plurality of bus bars is positioned on a more central side than the utmost end part of the stator core in the horizontal direction. Thus, it is possible to reduce the length of the stator of the rotary electric machine in the horizontal direction.

(4) In the stator of the rotary electric machine according to any one of (1) to (3), the bus bars have first extension parts (first extension parts 311U, 311V, and 311W), second extension parts (second extension parts 312U, 312V, and 312W), and third extension parts (third extension parts 313U, 313V, and 313W) which extend in mutually perpendicular three directions.

According to (4), the bus bars have the first extension parts, the second extension parts, and the third extension parts which extend in the mutually perpendicular three directions. Thus, when the first terminal parts and the second terminal parts are electrically connected to the terminal parts of respective phases of the coil and the terminal parts of the power conversion device, although a manufacturing error occurs in the bus bars, the stress can be dispersed by the first to third extension parts in the mutually perpendicular three directions. Accordingly, the cross-sectional areas of the bus bars can be reduced, and the cost of the bus bars can be reduced.

(5) In the stator of the rotary electric machine according to (4), the first extension parts extend in the rotational axis direction, the second extension parts extend in an upper and lower direction when viewed from the rotational axis direction, and the third extension parts extend in a horizontal direction when viewed from the rotational axis direction.

According to (5), the first to third extension parts extend in the mutually perpendicular three directions of the rotational axis direction, the upper and lower direction when viewed from the rotational axis direction, and the horizontal direction when viewed from the rotational axis direction. Thus, the stress can be dispersed by the first to third extension parts in the mutually perpendicular three directions, and the arrangement can be made excellent in the space efficiency.

(6) In the stator of the rotary electric machine according to (5), the third extension parts extend above the stator core in the horizontal direction when viewed from the rotational axis direction, and the third extension parts of the plurality of bus bars are arranged at the same height.

According to (6), the third extension parts extend above the stator core, and the third extension parts of the plurality of bus bars are arranged at the same height. Thus, it is possible to reduce the height of the upper side of the stator of the rotary electric machine.

(7) In the stator of the rotary electric machine according to any one of (1) to (6), the stator further including:

a cover member (cover member 40) which collectively covers the plurality of bus bars.

According to (7), the stator of the rotary electric machine includes the cover member which collectively covers the plurality of bus bars. Thus, the plurality of bus bars can be unitized by the cover member, and the plurality of bus bars can be handled as one body during assembly.

(8) In the stator of the rotary electric machine according to (7), the bus bars include bent parts (third bent parts 323U, 323V, and 323W), the cover member includes a cover part (cover part 42) which covers at least a periphery of the bent parts and a cover fixing part (cover fixing part 41b) for attaching the cover part to a support member (case 11), and the cover member is configured so as not to be in contact with the plurality of bus bars in a state where the cover fixing part is attached to the support member.

According to (8), the cover part covers at least the periphery of the bent parts. Thus, during the terminal connection operation, the plurality of bus bars can move to some extent within the cover part, and even when a manufacturing error occurs in each bus bar, the first terminal part and the second terminal part of each bus bar can be connected easily.

Further, since the cover member is configured so as not to be in contact with the plurality of bus bars in a state where the cover fixing part is attached to the support member, it is possible to prevent abnormal sounds generated due to the vibration.

(9) In the stator of the rotary electric machine according to any one of (1) to (8), wherein the rotary electric machine is mounted in a vehicle, and the first terminal parts are arranged on a more central side of the vehicle than the rotational axis of the rotary electric machine in a front and rear direction.

According to (9), the first terminal parts are arranged on the central side of the vehicle than the rotational axis of the rotary electric machine in the front and rear direction. Thus, the first terminal parts can be protected from the collision in the front and rear direction of the vehicle.

The invention claimed is:

1. A stator of a rotary electric machine comprising:
a stator core;
a coil attached to the stator core; and
a plurality of bus bars which have first terminal parts which are provided in one end portions thereof and electrically connected to terminal parts of respective phases of the coil, and second terminal parts which are provided in the other end portions thereof and electrically connected to terminal parts of a power conversion device corresponding to respective phases of the coil, wherein when viewed from a rotational axis direction of the rotary electric machine, the first terminal parts of the plurality of bus bars are arranged next to one another substantially in an upper and lower direction on the outside of the stator core in the radial direction, the second terminal parts of the plurality of bus bars are arranged next to one another substantially in a horizontal direction above the stator core, and a first terminal part arranged on an uppermost side among the first terminal parts of the plurality of bus bars is arranged to be positioned below an uppermost part of the stator core.

2. The stator of the rotary electric machine according to claim 1, wherein a first terminal part arranged on a lowermost side among the first terminal parts of the plurality of bus bars is arranged to be positioned above the rotational axis.

3. The stator of the rotary electric machine according to claim 1, wherein at least a part of the first terminal parts of the plurality of bus bars is positioned on a more central side than an utmost end part of the stator core in the horizontal direction.

4. The stator of the rotary electric machine according to claim 1, wherein the bus bars have first extension parts, second extension parts, and third extension parts which extend in mutually perpendicular three directions.

5. The stator of the rotary electric machine according to claim 4, wherein the first extension parts extend in the rotational axis direction, the second extension parts extend in an upper and lower direction when viewed from the rotational axis direction, and the third extension parts extend in a horizontal direction when viewed from the rotational axis direction.

6. The stator of the rotary electric machine according to claim 5, wherein the third extension parts extend above the stator core in the horizontal direction when viewed from the rotational axis direction, and the third extension parts of the plurality of bus bars are arranged at the same height.

7. The stator of the rotary electric machine according to claim 1, wherein the stator further comprising:

a cover member which collectively covers the plurality of bus bars.

8. The stator of the rotary electric machine according to claim 7, wherein the bus bars include bent parts, the cover member includes a cover part which covers at least a periphery of the bent parts and a cover fixing part for attaching the cover part to a support member, and the cover member is configured so as not to be in contact with the plurality of bus bars in a state where the cover fixing part is attached to the support member.

9. The stator of the rotary electric machine according to claim 1, wherein the rotary electric machine is mounted in a vehicle, and when the rotary electric machine is mounted in the vehicle such that an axis direction of the rotational axis of the rotary electric machine is directed in the right and left direction of the vehicle, the first terminal parts are arranged closer to the center of the vehicle than the rotational axis of the rotary electric machine in a front and rear direction.

* * * * *